Patented May 8, 1945

2,375,545

UNITED STATES PATENT OFFICE 2,375,545

PROCESS FOR THE PRODUCTION OF TRICHLOROACETONITRILE

Reginald T. Foster, Birkenhead, England, assignor to Imperial Chemical Industries Limited, a corporation of Great Britain No Drawing. Application October 7, 1943, Serial No. 505,377. In Great Britain October 2, 1942

2 Claims. (Cl. 260—464)

This invention relates to improvements in the production of chlorinated organic compounds, and more particularly to the production of trichloroacetonitrile.

Hitherto it has been customary to prepare trichloroacetonitrile by reacting trichloroacetamide with phosphorus pentoxide, or by passing chlorine into liquid acetonitrile using iodine as a catalyst. Neither of these methods gives satisfactory yields, and the first requires the comparatively expensive phosphorus pentoxide as one reagent, so that neither process is suitable for industrial operations.

It is an object of the present invention to provide a process for the production of trichloroacetonitrile which is suitable for industrial operation. It is a further object of the present invention to provide a process for the production of polymeric trichloroacetonitriles. It is a still further object of the present invention to provide a process for the production of trimeric trichloroacetonitrile. It is a still further object of the present invention to provide a process for the production of tetrameric trichloroacetonitrile. It is a still further object of our invention to provide a novel compound, viz., the tetrameric form of trichloroacetonitrile. Further objects will appear hereinafter.

According to the present invention these objects are achieved by carrying out a process which includes the steps of passing over a non-volatile chlorination catalyst at an elevated temperature above the boiling point of trichloroacetonitrile a mixture comprising chlorine and acetonitrile containing not less than 3 mols of chlorine per mol of acetonitrile. Advantageously the chlorination catalyst is an active carbon catalyst, e. g. unimpregnated active carbon, or active carbon impregnated with a halide of zinc, copper or of an alkaline earth metal, e. g. with a chloride of such a metal. Advantageously also the catalyst is maintained at a temperature between 200° and 400° C.

The reaction involved is represented by the equation $$CH_3CN + 3Cl_2 \rightarrow CCl_3CN + 3HCl$$

On stoichiometric considerations the reaction mixture should thus contain 3 mols of chlorine per mol of acetonitrile; preferably more than this is present, e. g., an amount of chlorine corresponding to between 3 and 4 mols per mol of acetonitrile.

Provided adequate reaction time is allowed the gaseous mixture which leaves the catalyst chamber will be substantially free from mono- or di- chloroacetonitrile, at least when an active carbon catalyst is used although with a very fast current of reactants or with a catalyst of low activity, e. g. wood charcoal, some of these constituents may be present. Suitable velocities will depend to some extent on the temperature of the catalyst; in the preferred temperature range space velocities of 0.5 to 5 min.$^{-1}$ are suitable, i. e. a velocity such that the volume of reactants passing over the catalyst in 1 minute is between 0.5 and 5 times the volume of the catalyst.

In one method of carrying out the invention, chlorine is bubbled through a vessel containing liquid acetonitrile which is maintained at an elevated temperature at which the vapour pressure of the acetonitrile is sufficient to produce a reaction mixture consisting of acetonitrile vapour and chlorine in the required proportions. We find that a suitable reaction mixture can be obtained by maintaining the acetonitrile at a temperature between 35° and 45° C. It is desirable for the temperature of the acetonitrile to be thermostatically controlled in order that the composition of the mixture may remain substantially constant.

Inert gases such as nitrogen may also be introduced into the reaction mixture, e. g. by passing a mixture of chlorine and nitrogen into the acetonitrile, but we do not find that advantage accrues by doing so.

The mixed gases are then passed with a space velocity between 0.5 and 5 min.$^{-1}$ through the catalyst chamber maintained at an elevated temperature, e. g. a temperature between 250° C. and 300° C., and packed with the chlorination catalyst, e. g. with active carbon or with active carbon impregnated with barium chloride.

After leaving the catalyst chamber the gases are cooled to condense out the trichloroacetonitrile, unchanged acetonitrile and by-products. Suitably two condensers are used in series, one being water-cooled to condense the bulk of the product, and the other brine-cooled, e. g. to between —10° C. and —20° C. to condense the remainder. The trichloroacetonitrile can then be isolated from the combined condensates by fractional distillation, preferably after washing with water and drying, e. g. over calcium chloride.

In carrying out the fractional distillation any unchanged acetonitrile present first distils off and also some carbon tetrachloride evidently formed through pyrolytic decomposition, while a substantial proportion of material is left in the still which cannot be distilled at ordinary pressures without decomposition. The crude product is substantially free from monochloro- or dichloro-acetonitrile.

The fraction left in the still can be distilled under reduced pressure, e. g. in vacuo and two fractions thereby isolated which solidify to white crystalline solids with slight aromatic odour and which can be recrystallised by precipitation with water from alcoholic solution. These solids are respectively the trimer and tetramer of trichloroacetanitrile, the former melting at 59° C. and the second at 77° C.

The following examples illustrate but do not limit our invention.

*Example I*

An apparatus was employed comprising a closed vessel for acetonitrile to which chlorine could be supplied below the acetonitrile surface, a catalyst chamber in communication with the acetonitrile vessel, and two condensers in series to receive gases from the catalyst chamber and condense the crude trichloroacetonitrile-containing product.

The first was maintained between 15° and 20° C. by cold water circulation, and the second between —10° C. and —20° C. by brine circulation. The condensate from each condenser could be run into a common washing vessel and thence after contacting with dehydrated calcium chloride to a still in which the mixed condensate could be fractionated.

The catalyst chamber was packed with active carbon impregnated with a fifth of its weight of barium chloride and heated to 300° C. A quantity of acetonitrile in excess of the amount required for the run was then charged into the closed vessel and heated to 38° C. The temperature was then kept at 38° C.±1° C. by means of a thermostatic control.

Chlorine was then passed into the acetonitrile for 6¾ hours at a regular rate and the resulting mixture of chlorine and acetonitrile vapour, containing on the average 22% of the latter by volume, was delivered to the catalyst chamber, and the reaction products from the chamber were passed thence to the condenser. The mixture passed through the catalyst chamber with a space velocity of 4.5 min.$^{-1}$. The condensate from the condensers was washed with water and dried over dehydrated calcium chloride. It was then fractionated in the still and the trichloroacetonitrile fraction collected. The trichloroacetonitrile obtained corresponded to a 54% yield calculated on the acetonitrile consumed.

*Example II*

The apparatus described in Example I was employed, the catalyst chamber being packed with active carbon and heated to 290° C. The charge of acetonitrile in the first vessel was maintained at 38° C.±1° C. Chlorine was passed into the acetronitrile for 12¾ hours and the resulting mixture of chlorine and acetonitrile vapour, containing on the average 22% of the latter by volume, was passed through the catalyst chamber with a space velocity of 4.3 min.$^{-1}$. The condensate from the condenser was washed with water, dried over calcium chloride, fractionated in the still, and the trichloroacetonitrile fraction collected. The trichloroacetonitrile obtained corresponded to a 55% yield calculated on the acetonitrile.

After distilling off the trichloroacetonitrile an oily liquid remained in the still which represented approximately 25% by weight of the crude reaction product. On distilling this liquid at a pressure between 8 mm. and 9 mm. of mercury, two fractions were obtained boiling at 155° C. and 170° C. respectively. The first of the fractions melted at 59° C. and was the trimer $(CCl_3CN)_3$; on analysis it furnished the following data:

|  | Found | Calculated for $(CCl_3CN)_3$ |
|---|---|---|
|  | *Per cent* | *Per cent* |
| Carbon | 18.2 | 16.6 |
| Chlorine | 71.1 | 73.7 |
| Nitrogen | 10.6 | 9.7 |
| Hydrogen | <0.5 | ------ |
| Molecular weight | 423 | 433.5 |

The second fraction melted at 77° C., and was shown by the following data to be the tetramer $(CCl_3CN)_4$:

|  | Found | Calculated for $(CCl_3CN)_4$ |
|---|---|---|
|  | *Per cent* | *Per cent* |
| Carbon | 16.8 | 16.6 |
| Chlorine | 72.6 | 73.7 |
| Nitrogen | 10.6 | 9.7 |
| Hydrogen | <0.5 | ------ |
| Molecular weight | 576 | 578 |

I claim:

1. In a process for the production of trichloroacetonitrile and its polymers, the step of passing over an active carbon catalyst impregnated with a compound selected from the group consisting of zinc halide, copper halide and alkaline earth metal halides, at a temperature between 200° C. and 400° C., a mixture comprising chlorine and acetonitrile and containing not less than 3 mols of chlorine per mol of acetonitrile.

2. In a process for the production of trichloroacetonitrile and its polymers, the step of passing over an active carbon catalyst impregnated with a compound selected from the group consisting of zinc halide, copper halide and alkaline earth metal halides, at a temperature between 200° and 400° C., a mixture of chlorine and acetonitrile containing between 3 mols and 4 mols of chlorine per mol of acetonitrile.

REGINALD T. FOSTER.